(12) United States Patent
Nelson et al.

(10) Patent No.: US 7,819,137 B2
(45) Date of Patent: Oct. 26, 2010

(54) VALVE MOUNTING ASSEMBLY

(75) Inventors: Alfred C. Nelson, Carmel, IN (US); Jeffrey L. Moore, Frankfort, IN (US)

(73) Assignees: Masco Corporation of Indiana, Indianapolis, IN (US); Mercury Plastics, Inc., Middlefield, OH (US)

( * ) Notice: Subject to any disclaimer, the term of this patent is extended or adjusted under 35 U.S.C. 154(b) by 0 days.

(21) Appl. No.: 12/244,429

(22) Filed: Oct. 2, 2008

(65) Prior Publication Data

US 2009/0020177 A1 Jan. 22, 2009

Related U.S. Application Data

(63) Continuation of application No. 11/700,634, filed on Jan. 31, 2007.

(60) Provisional application No. 60/809,033, filed on May 26, 2006.

(51) Int. Cl.
*F16K 11/078* (2006.01)
(52) U.S. Cl. .................... 137/625.4; 4/695
(58) Field of Classification Search ........... 137/625.4, 137/625.41, 625.17, 801; 4/695
See application file for complete search history.

(56) References Cited

U.S. PATENT DOCUMENTS

| | | | |
|---|---|---|---|
| 2,200,091 A | 5/1940 | Kovach |
| 2,219,471 A | 10/1940 | Davis |
| 2,546,327 A | 3/1951 | Young |
| 2,548,933 A | 4/1951 | Barnett |
| 2,781,786 A | 2/1957 | Young |
| 2,884,007 A | 4/1959 | Green |
| 3,229,710 A | 1/1966 | Keller, III |
| 3,422,849 A | 1/1969 | Manoogian |
| 3,448,768 A | 6/1969 | Keller, III |
| 3,505,098 A | 4/1970 | Miller et al. |
| 3,520,325 A | 7/1970 | Stuart |
| 3,580,289 A | 5/1971 | James et al. |
| 3,590,876 A | 7/1971 | Young |
| 3,600,723 A | 8/1971 | Mongerson et al. |
| 3,714,958 A | 2/1973 | Johnson et al. |
| 3,757,824 A | 9/1973 | Parkhurst et al. |
| 3,770,004 A | 11/1973 | Johnson et al. |
| 3,796,380 A | 3/1974 | Johnson et al. |
| 3,807,453 A | 4/1974 | Dom et al. |
| 3,854,493 A | 12/1974 | Farrell |
| 3,965,936 A | 6/1976 | Lyon |
| 3,989,787 A | 11/1976 | Scott, Jr. et al. |
| 3,998,240 A | 12/1976 | Liautaud |
| 4,026,328 A | 5/1977 | Nelson |

(Continued)

FOREIGN PATENT DOCUMENTS

DE          10133041          1/2003

(Continued)

OTHER PUBLICATIONS

Dadex Polydex, 2005, 1 pg.

(Continued)

*Primary Examiner*—John Fox
(74) *Attorney, Agent, or Firm*—Baker & Daniels LLP

(57) ABSTRACT

A faucet including a waterway assembly fluidly coupled to a valve assembly.

16 Claims, 7 Drawing Sheets

U.S. PATENT DOCUMENTS

| | | | |
|---|---|---|---|
| 4,076,279 | A | 2/1978 | Klotz et al. |
| 4,103,709 | A | 8/1978 | Fischer |
| 4,130,136 | A | 12/1978 | Garnier et al. |
| 4,221,338 | A | 9/1980 | Shames et al. |
| 4,316,870 | A | 2/1982 | Rowley |
| 4,337,795 | A | 7/1982 | Argyris et al. |
| 4,356,574 | A | 11/1982 | Johnson |
| 4,357,957 | A | 11/1982 | Bisonaya et al. |
| 4,387,738 | A | 6/1983 | Bisonaya et al. |
| 4,397,330 | A | 8/1983 | Hayman |
| 4,415,389 | A | 11/1983 | Medford et al. |
| 4,446,084 | A | 5/1984 | Rowley |
| 4,453,567 | A | 6/1984 | MacDonald |
| 4,458,839 | A | 7/1984 | MacDonald |
| 4,484,600 | A | 11/1984 | Peterson et al. |
| 4,502,507 | A | 3/1985 | Hayman |
| 4,513,769 | A | 4/1985 | Purcell |
| 4,525,136 | A | 6/1985 | Rowley |
| 4,552,171 | A | 11/1985 | Farrell et al. |
| 4,577,835 | A | 3/1986 | Holycross et al. |
| 4,580,601 | A | 4/1986 | Schlotman et al. |
| 4,592,388 | A | 6/1986 | Wilcox |
| 4,607,659 | A | 8/1986 | Cole |
| 4,610,429 | A | 9/1986 | Arnold et al. |
| 4,626,005 | A | 12/1986 | Stifter |
| 4,635,673 | A | 1/1987 | Gerdes |
| 4,649,958 | A | 3/1987 | Purcell |
| 4,652,263 | A | 3/1987 | Herweck et al. |
| 4,664,423 | A | 5/1987 | Rowley |
| 4,667,987 | A | 5/1987 | Knebel |
| 4,671,316 | A | 6/1987 | Botnick |
| 4,687,025 | A | 8/1987 | Kahle et al. |
| 4,700,928 | A | 10/1987 | Marty |
| 4,708,172 | A | 11/1987 | Riis |
| 4,749,003 | A | 6/1988 | Leason |
| 4,754,993 | A | 7/1988 | Kraynick |
| 4,760,871 | A | 8/1988 | Vijay |
| 4,762,143 | A | 8/1988 | Botnick |
| 4,773,348 | A | 9/1988 | Rowley |
| 4,783,303 | A | 11/1988 | Imgram |
| 4,803,033 | A | 2/1989 | Rowley |
| 4,838,304 | A | 6/1989 | Knapp |
| 4,853,164 | A | 8/1989 | Kiang et al. |
| 4,877,660 | A | 10/1989 | Overbergh et al. |
| 4,887,642 | A | 12/1989 | Bernat |
| 4,942,644 | A | 7/1990 | Rowley |
| 4,957,135 | A | 9/1990 | Knapp |
| 4,971,112 | A | 11/1990 | Knapp |
| 4,979,530 | A | 12/1990 | Breda |
| 5,001,008 | A | 3/1991 | Tokita et al. |
| 5,006,207 | A | 4/1991 | Peterman et al. |
| 5,027,851 | A | 7/1991 | Drees et al. |
| 5,053,097 | A | 10/1991 | Johansson et al. |
| 5,090,062 | A | 2/1992 | Hochstrasser |
| 5,095,554 | A | 3/1992 | Gloor |
| 5,100,565 | A | 3/1992 | Fujiwara et al. |
| 5,110,044 | A | 5/1992 | Bergmann |
| 5,127,814 | A | 7/1992 | Johnson et al. |
| 5,131,428 | A | 7/1992 | Bory |
| 5,148,837 | A | 9/1992 | Ågren et al. |
| 5,150,922 | A | 9/1992 | Nakashiba et al. |
| 5,219,185 | A | 6/1993 | Oddenino |
| 5,279,333 | A | 1/1994 | Lawrence |
| 5,340,018 | A | 8/1994 | Macdonald et al. |
| 5,366,253 | A | 11/1994 | Nakashiba et al. |
| 5,375,889 | A | 12/1994 | Nakashiba et al. |
| 5,397,102 | A | 3/1995 | Kingman |
| 5,417,242 | A | 5/1995 | Goncze |
| 5,437,345 | A | 8/1995 | Schmidt et al. |
| 5,493,873 | A | 2/1996 | Donselman et al. |
| 5,494,259 | A | 2/1996 | Peterson |
| 5,518,027 | A | 5/1996 | Saiki et al. |
| 5,527,503 | A | 6/1996 | Rowley |
| 5,553,935 | A | 9/1996 | Burnham et al. |
| 5,555,912 | A | 9/1996 | Saadi et al. |
| 5,558,128 | A | 9/1996 | Pawelzik et al. |
| 5,566,707 | A | 10/1996 | Ching et al. |
| 5,573,037 | A | 11/1996 | Cole et al. |
| 5,577,393 | A | 11/1996 | Donselman et al. |
| 5,579,808 | A | 12/1996 | Mikol et al. |
| 5,582,438 | A | 12/1996 | Wilkins et al. |
| 5,586,746 | A | 12/1996 | Humpert et al. |
| 5,611,093 | A | 3/1997 | Barnum et al. |
| 5,615,709 | A | 4/1997 | Knapp |
| 5,622,210 | A | 4/1997 | Crisman et al. |
| 5,622,670 | A | 4/1997 | Rowley |
| 5,642,755 | A | 7/1997 | Mark et al. |
| 5,660,692 | A | 8/1997 | Nesburn et al. |
| 5,669,407 | A | 9/1997 | Bailey |
| 5,669,417 | A | 9/1997 | Lian-Jie |
| 5,669,595 | A | 9/1997 | Bytheway |
| 5,685,341 | A | 11/1997 | Chrysler et al. |
| 5,687,952 | A | 11/1997 | Arnold et al. |
| 5,695,094 | A | 12/1997 | Burnham et al. |
| 5,725,008 | A | 3/1998 | Johnson |
| 5,730,173 | A | 3/1998 | Sponheimer |
| 5,741,458 | A | 4/1998 | Rowley |
| 5,746,244 | A | 5/1998 | Woolley, Sr. et al. |
| 5,756,023 | A | 5/1998 | Stachowiak |
| 5,758,690 | A | 6/1998 | Humpert et al. |
| 5,775,587 | A | 7/1998 | Davis |
| 5,803,120 | A | 9/1998 | Bertoli |
| 5,813,435 | A | 9/1998 | Knapp |
| 5,833,279 | A | 11/1998 | Rowley |
| 5,850,855 | A | 12/1998 | Kerschbaumer et al. |
| 5,857,489 | A | 1/1999 | Chang |
| 5,861,200 | A | 1/1999 | Rowley |
| 5,865,473 | A | 2/1999 | Semchuchk et al. |
| 5,875,809 | A | 3/1999 | Barrom |
| 5,893,387 | A | 4/1999 | Paterson et al. |
| 5,895,695 | A | 4/1999 | Rowley |
| 5,916,647 | A | 6/1999 | Weinstein |
| 5,924,451 | A | 7/1999 | Kuo |
| 5,927,333 | A | 7/1999 | Grassberger |
| 5,934,325 | A | 8/1999 | Brattoli et al. |
| 5,937,892 | A | 8/1999 | Meisner et al. |
| 5,944,225 | A | 8/1999 | Kawolics |
| 5,950,663 | A | 9/1999 | Bloomfield |
| 5,960,490 | A | 10/1999 | Pitch |
| 5,965,077 | A | 10/1999 | Rowley et al. |
| 5,975,143 | A | 11/1999 | Järvenkylä et al. |
| 5,979,489 | A | 11/1999 | Pitch |
| 6,013,382 | A | 1/2000 | Coltrinari et al. |
| 6,023,796 | A | 2/2000 | Pitsch |
| 6,029,860 | A | 2/2000 | Donselman et al. |
| 6,029,948 | A | 2/2000 | Shafer |
| 6,044,859 | A | 4/2000 | Davis |
| 6,053,214 | A | 4/2000 | Sjoberg et al. |
| 6,062,251 | A | 5/2000 | Pitch |
| 6,070,614 | A | 6/2000 | Holzheimer et al. |
| 6,070,916 | A | 6/2000 | Rowley |
| 6,073,972 | A | 6/2000 | Rivera |
| 6,079,447 | A | 6/2000 | Holzheimer et al. |
| 6,082,407 | A | 7/2000 | Paterson et al. |
| 6,082,780 | A | 7/2000 | Rowley et al. |
| 6,085,784 | A | 7/2000 | Bloom et al. |
| 6,116,884 | A | 9/2000 | Rowley |
| 6,123,232 | A | 9/2000 | Donselman et al. |
| 6,131,600 | A | 10/2000 | Chang |
| 6,138,296 | A | 10/2000 | Baker |
| 6,155,297 | A | 12/2000 | MacAusland et al. |
| 6,161,230 | A | 12/2000 | Pitsch |
| 6,170,098 | B1 | 1/2001 | Pitsch |
| 6,177,516 | B1 | 1/2001 | Hudak |

| | | | |
|---|---|---|---|
| 6,202,686 B1 | 3/2001 | Pitsch et al. | |
| 6,227,464 B1 | 5/2001 | Allmendinger et al. | |
| 6,238,575 B1 | 5/2001 | Patil | |
| 6,256,810 B1 | 7/2001 | Baker | |
| 6,270,125 B1 | 8/2001 | Rowley et al. | |
| 6,286,808 B1 | 9/2001 | Slothower et al. | |
| 6,287,501 B1 | 9/2001 | Rowley | |
| 6,293,336 B1 | 9/2001 | Emerick, Sr. et al. | |
| 6,296,017 B2 | 10/2001 | Kimizuka | |
| 6,305,407 B1 | 10/2001 | Selby | |
| 6,315,715 B1 | 11/2001 | Taylor et al. | |
| 6,328,059 B1 | 12/2001 | Testori et al. | |
| 6,334,466 B1 | 1/2002 | Jani et al. | |
| 6,341,617 B1 | 1/2002 | Wilson | |
| 6,349,733 B1 | 2/2002 | Smith | |
| 6,378,790 B1 | 4/2002 | Paterson et al. | |
| 6,385,794 B1 | 5/2002 | Miedzius et al. | |
| 6,439,581 B1 | 8/2002 | Chang | |
| 6,464,266 B1 | 10/2002 | O'Neill et al. | |
| 6,485,666 B1 | 11/2002 | Rowley | |
| 6,557,907 B2 | 5/2003 | Rowley | |
| 6,609,732 B1 | 8/2003 | Souvatzidis et al. | |
| 6,635,334 B1 | 10/2003 | Jackson et al. | |
| 6,640,357 B1 | 11/2003 | Chang | |
| 6,732,543 B2 | 5/2004 | Jenkins, Jr. et al. | |
| 6,770,376 B2 | 8/2004 | Chen | |
| 6,770,384 B2 | 8/2004 | Chen | |
| 6,783,160 B2 | 8/2004 | Rowley | |
| 6,803,133 B2 | 10/2004 | Chen | |
| 6,817,379 B2 | 11/2004 | Perla | |
| 6,835,777 B2 | 12/2004 | Botros | |
| 6,838,041 B2 | 1/2005 | Rowley | |
| 6,848,719 B2 | 2/2005 | Rowley | |
| 6,860,523 B2 | 3/2005 | O'Neill et al. | |
| 6,860,524 B1 | 3/2005 | Rowley | |
| 6,877,172 B2 | 4/2005 | Malek et al. | |
| 6,894,115 B2 | 5/2005 | Botros | |
| 6,902,210 B1 | 6/2005 | Rowley | |
| 6,920,899 B2 | 7/2005 | Haenlein et al. | |
| 6,959,736 B2 | 11/2005 | Järvenkylä | |
| 6,962,168 B2 | 11/2005 | McDaniel et al. | |
| 6,978,795 B2 | 12/2005 | Perrin | |
| 7,063,105 B1 | 6/2006 | Chen | |
| 7,111,640 B2 | 9/2006 | Rhodes | |
| 7,118,138 B1 | 10/2006 | Rowley et al. | |
| 7,134,452 B2 * | 11/2006 | Hiroshi et al. | 137/625.41 |
| 7,225,828 B2 | 6/2007 | Giagni et al. | |
| 7,231,936 B2 | 6/2007 | Chang | |
| 2002/0100139 A1 | 8/2002 | Rowley | |
| 2002/0100510 A1 | 8/2002 | Otelli | |
| 2002/0167171 A1 | 11/2002 | Becker et al. | |
| 2003/0183286 A1 | 10/2003 | Yang | |
| 2004/0007278 A1 | 1/2004 | Williams | |
| 2004/0021120 A1 | 2/2004 | Turnau, III et al. | |
| 2004/0060608 A1 | 4/2004 | Angus | |
| 2004/0117906 A1 | 6/2004 | Baker et al. | |
| 2004/0150132 A1 | 8/2004 | Rowley | |
| 2004/0176503 A1 | 9/2004 | Czayka et al. | |
| 2005/0005989 A1 | 1/2005 | Roloff | |
| 2005/0194051 A1 | 9/2005 | Pinette | |
| 2006/0108705 A1 | 5/2006 | Rowley | |
| 2006/0118185 A1 | 6/2006 | Nobili | |
| 2006/0124183 A1 | 6/2006 | Kuo | |
| 2006/0130908 A1 | 6/2006 | Marty et al. | |
| 2006/0170134 A1 | 8/2006 | Rowley et al. | |
| 2006/0174955 A1 | 8/2006 | Huang | |
| 2006/0202142 A1 | 9/2006 | Marty et al. | |
| 2007/0044852 A1 | 3/2007 | Pinette | |
| 2007/0137714 A1 | 6/2007 | Meehan et al. | |
| 2007/0137718 A1 | 6/2007 | Rushlander et al. | |
| 2007/0271695 A1 | 11/2007 | Thomas et al. | |

FOREIGN PATENT DOCUMENTS

| | | |
|---|---|---|
| EP | 0 632 220 | 1/1995 |
| EP | 0 808 952 | 11/1997 |
| JP | 3094877 | 4/1991 |
| JP | 200132343 | 6/2008 |
| WO | WO 91/05191 | 4/1991 |
| WO | WO 00/61831 | 10/2000 |
| WO | WO 02/25022 | 3/2002 |
| WO | WO 2005/108829 | 11/2005 |

OTHER PUBLICATIONS

Dadex Polydex—PPR Pipe System for Hot and Cold Water Supply and Distribution, 2005, 2 pgs.
Dow, Plastic Pipes Europe, Middle East & Africa, Hot and Cold Water Pipes, 2007, 1 pg.
Dow, Plastic Pipes Europe, Middle East, & Africa, Dowlex PE-RT, 2007, 2 pgs.
Kerox, Standard Cartridges, 2005, 3 pgs.
Kerox, Ceramic Mixing Cartridge, Conventional Single-Lever Type, Model K-28, undated, 2 pgs.
Ticona Engineering Polymers, Engineering Polymers for Innovative Applications catalog, Mar. 2006, 16 pgs.
PEX Association, What is PE-X?, undated, 7 pgs.
Noveon, Inc.; Processing with TempRite® PEX Ensures Quality Piping, www.tempritepex.com/processingInstallation/processing.asp, at least as early as Jun. 7, 2005, 2 pgs.
SpecialChem S.A., Silane Crosslinking Agents Center, Crosslinking Mechanism, www.specialchem4polymers.com/tc/silane-crosslinking-agents/index.aspx?id=mechanism, at least as early as Jun. 7, 2005, 2 pgs.
PPI Plastics Pipe Institute, Crosslinked Polyethylene (PEX) Tubing, TN-17/2001, www.plasticpipe.org/pdf/pubs/notes/tn17-01.pdf, Jun. 2001, 7 pgs.

* cited by examiner

VALVE MOUNTING ASSEMBLY

CROSS-REFERENCE TO RELATED APPLICATION

This application is a continuation-in-part of U.S. patent application Ser. No. 11/700,634, filed Jan. 31, 2007, which claims the benefit of U.S. Provisional Patent Application Ser. No. 60/809,033, filed May 26, 2006, the disclosures of which are expressly incorporated by reference herein.

BACKGROUND AND SUMMARY OF THE INVENTION

The present invention relates generally to plumbing fixtures and, more particularly, to a faucet including a waterway assembly fluidly coupled to a valve assembly.

Single handle faucets typically include mixing valves that control the flow of both hot and cold water to a delivery spout. These faucets have found wide acceptance and are commonly constructed such that a handle or knob is movable in distinct directions to adjust the temperature (i.e., the mix of hot and cold water) and the flow rate of water.

As with any fluid delivery device, it is desirable to provide a mounting assembly that prevents water leakage below the mounting deck. The present disclosure provides a valve mounting assembly including a sealing arrangement configured to prevent water leakage below the mounting deck.

According to an illustrative embodiment of the present disclosure, a fluid delivery device includes a waterway assembly defining a longitudinal axis and having a first fluid transport component, a second fluid transport component, and an interface member coupled to an end of the first fluid transport component and an end of the second fluid transport component. The fluid delivery device further includes a valve assembly fluidly coupled to the interface member of the waterway assembly, the valve assembly having a first port in fluid communication with the first fluid transport component, a second port in fluid communication with the second fluid transport component, and a movable valve member configured to control the flow of water through the first port and the second port. A primary seal is positioned intermediate the waterway assembly and the valve assembly, the primary seal being configured to provide a fluid seal between the first fluid transport component of the waterway assembly and the first port of the valve assembly and a fluid seal between the second fluid transport component of the waterway assembly and the second port of the valve assembly. A secondary seal is positioned laterally outwardly from the primary seal, the secondary seal being configured to sealingly couple to the interface member of the waterway assembly.

According to a further illustrative embodiment of the present disclosure, a waterway assembly includes an interface member having a first surface and a second surface, a first opening extending into the first surface, and a second opening extending into the first surface. A first seat is supported by the interface member and is configured to sealingly engage a face seal, and a second seat is supported by the interface member and is configured to sealingly engage a radial seal.

According to another illustrative embodiment of the present disclosure, a fluid delivery device includes a holder, a waterway assembly having an interface member supported by the holder, a hot water inlet tube having a first end fluidly coupled to the interface member and a second end configured to be fluidly coupled to a hot water supply, and a cold water inlet tube having a first end fluidly coupled to the interface member and a second end configured to be fluidly coupled to a cold water supply. A valve assembly includes a hot water inlet port in fluid communication with the hot water inlet tube, a cold water inlet port in fluid communication with the cold water inlet tube, and a movable valve member configured to control the flow of water through the hot water and cold water inlet ports. A face seal is positioned intermediate the waterway assembly and the valve assembly. A locking member is operably coupled to the valve assembly and is configured to secure the valve assembly to the waterway assembly. A radial seal is positioned intermediate the interface member of the waterway assembly and the locking member.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiment selected for description have been chosen to enable one skilled in the art to practice the invention.

Figure 1:
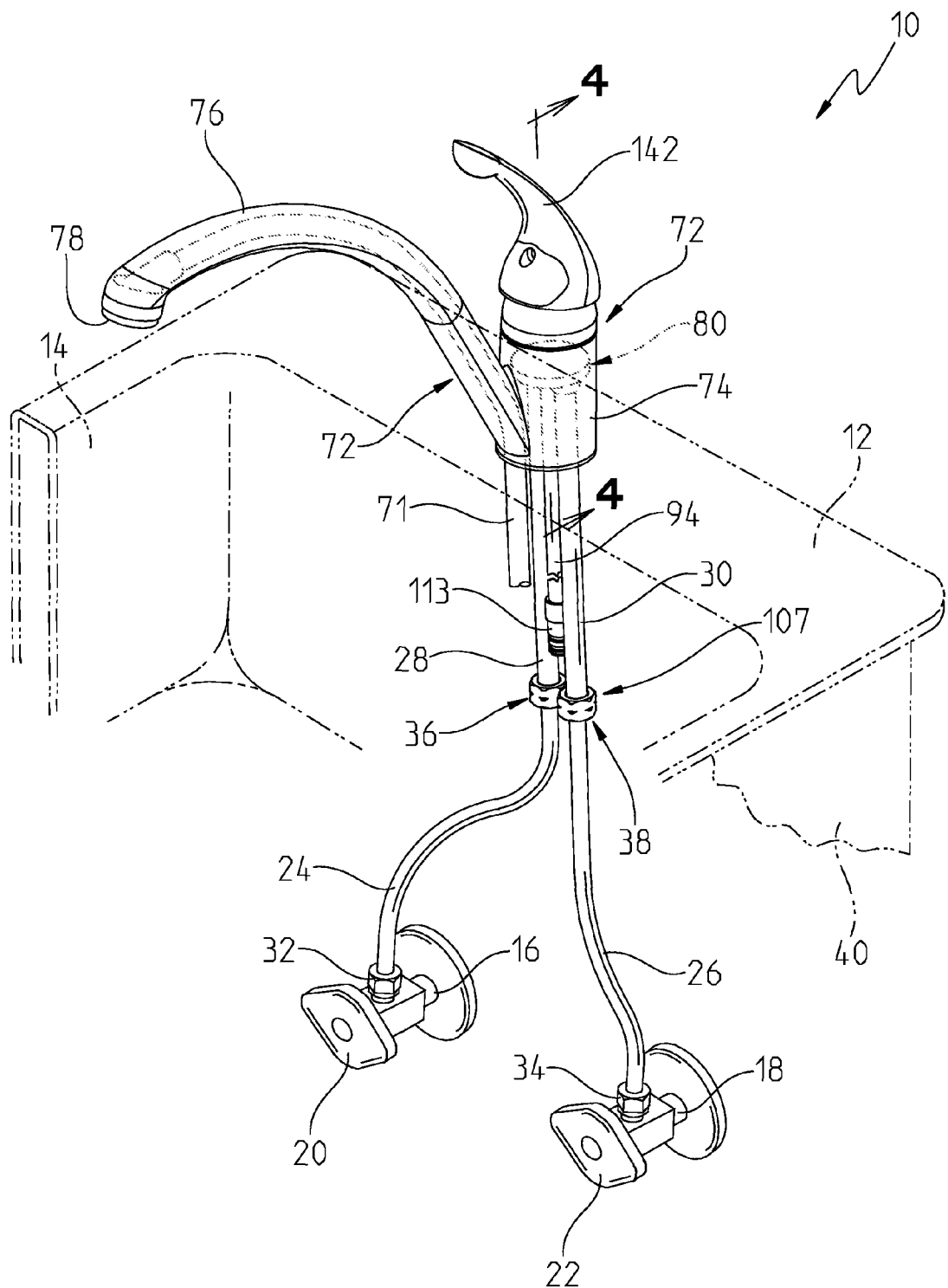
FIG. 1 is a perspective view of an illustrative embodiment faucet of the present disclosure mounted to the sink deck and fluidly coupled to hot and cold water supply lines.

Referring initially to FIG. 1, an illustrative embodiment faucet 10 is shown mounted to a sink or mounting deck 12 above a sink basin 14. The faucet 10 is fluidly coupled to hot and cold water supplies or sources 16 and 18 through conventional stops 20 and 22, respectively. Hot and cold water risers 24 and 26 may fluidly couple the stops 20 and 22 to hot and cold water inlet fluid transport components, or tubes 28 and 30, respectively. The hot and cold water risers 24 and 26 are fluidly coupled to the stops 20 and 22 through fluid couplings 32 and 34. While FIG. 1 illustrates hot and cold water risers 24 and 26 coupled to inlet tubes 28 and 30 through fluid couplings 36 and 38, it should be appreciated that the inlet tubes 28 and 30 may extend uninterrupted from the faucet 10 to the stops 20 and 22. In a further illustrative embodiment, the inlet tubes 28 and 30 may be directly coupled behind a wall 40 to the plumbing system of the building or house.

Figure 2:
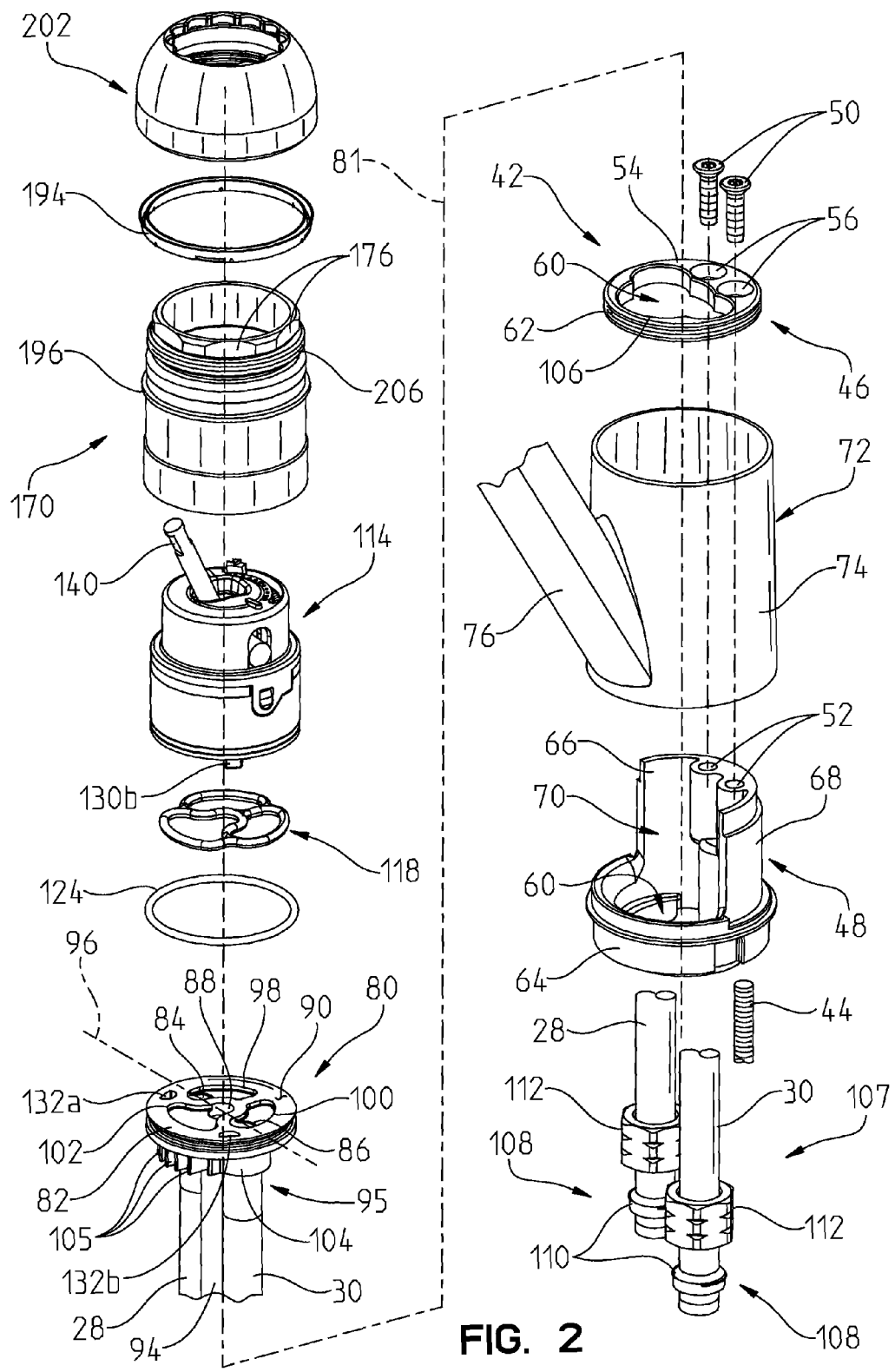
FIG. 2 is a partial top exploded perspective view of the faucet of FIG. 1.
Figure 3:
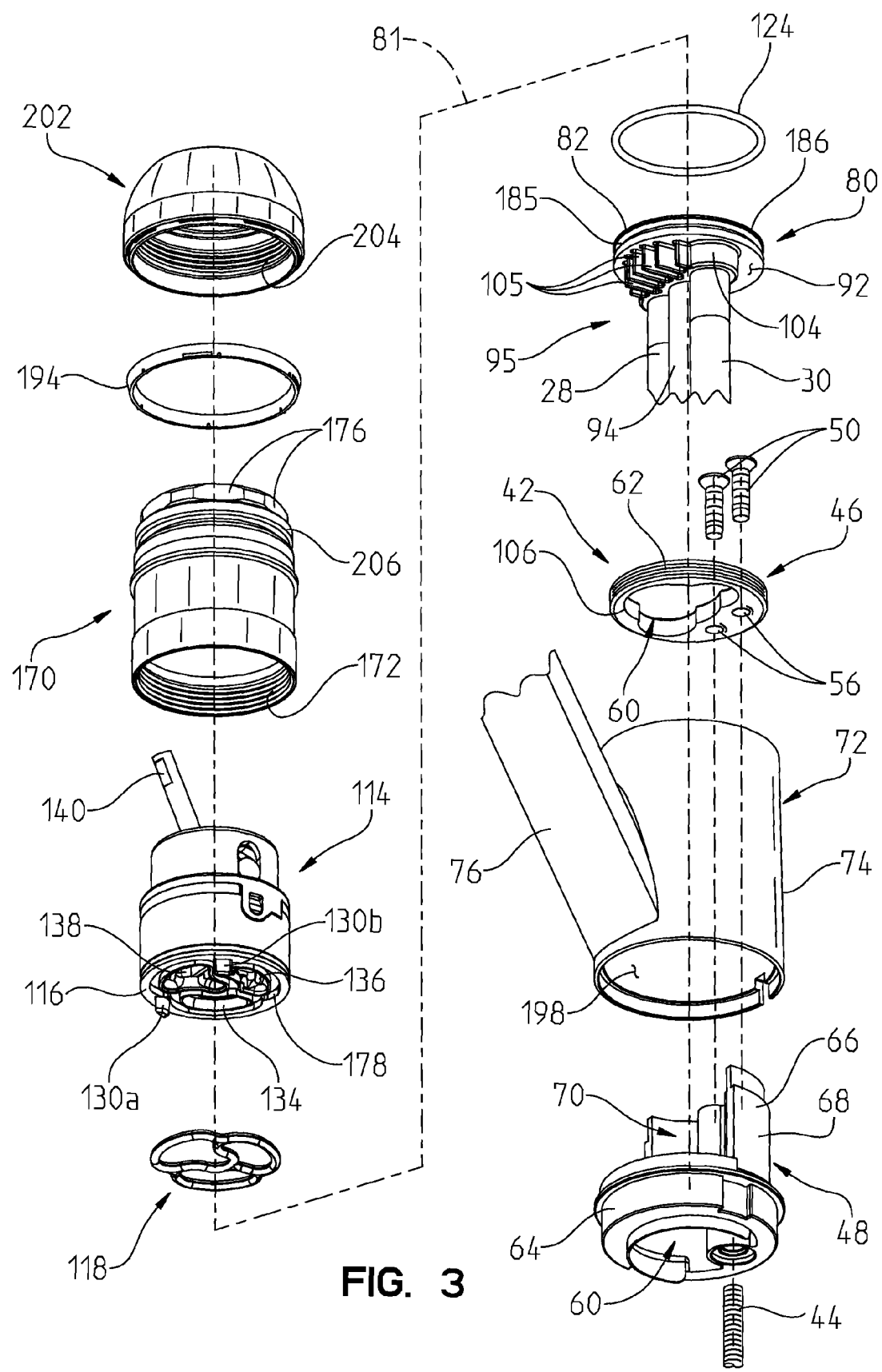
FIG. 3 is a partial bottom exploded perspective view of the faucet of FIG. 1.
Figure 4:
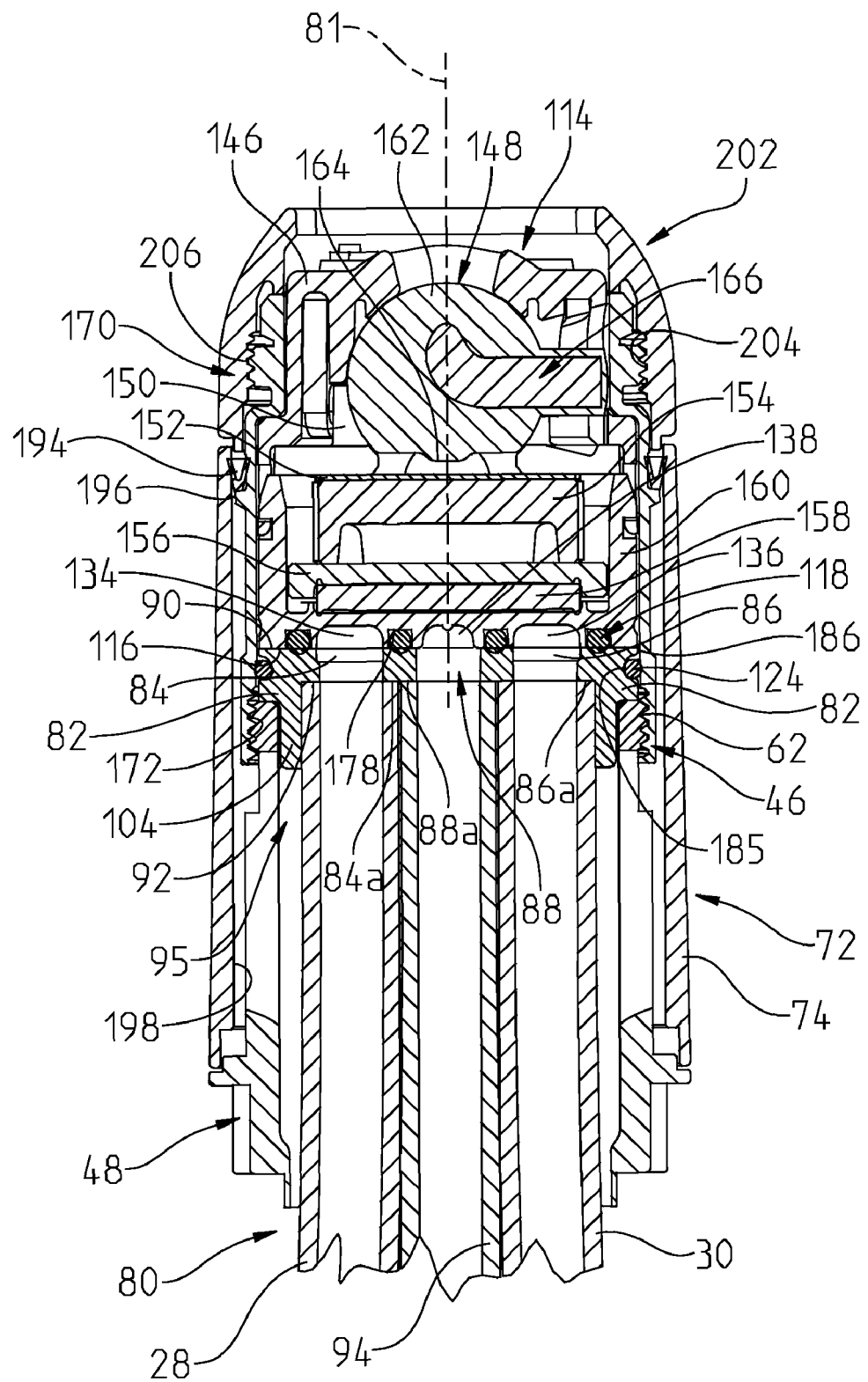
FIG. 4 is a cross-sectional view taken along line 4-4 of FIG. 1.

Referring to FIGS. 2-4, the faucet 10 includes a stand or holder 42 configured to be secured to the sink deck 12. A securing member, illustratively a threaded mounting rod 44 extends downwardly from the holder 42. A nut and bracket (not shown) may threadably engage the mounting rod 44 for securing the holder 42 to the sink deck 12.

The holder 42 includes a cap 46 secured to a base 48, illustratively through a pair of fasteners, such as stainless steel screws 50. The screws 50 are received within threaded apertures 52 formed within the base 48. The cap 46 includes a platform 54 having a pair of thru openings 56 to receive the screws 50 and surrounding an elongated opening 60. A plurality of external threads 62 are formed within the outer edge surface of the cap 46. The cap 46 is illustratively formed of a rigid material, such as brass.

The base 48 illustratively includes a cylindrical lower portion 64 and an upper portion 66 having a semi-circular wall 68 supporting the cap 46. The semi-circular wall 68 defines an opening 70 configured to receive a delivery spout tube 71 (FIG. 1) as further detailed herein. In one illustrative embodiment, the base 48 is molded from a polymer, such as a long-fiber reinforced thermoplastic (LFRT) exhibiting high dimensional stability and strong mechanical properties. One such LFRT is Celstran® available from Ticona of Florence, Ky. However, it should be noted that the base 48 may be formed of other suitable materials, such as stainless steel or brass.

The holder 42 is illustratively received within a housing 72, which may be formed of a rigid material, such as brass. As shown in FIGS. 1-3, the housing 72 may comprise a delivery spout including a hub 74 and a spout portion 76. In other illustrative embodiments, the housing 72 may comprise an escutcheon, trim, or other faucet component. The spout tube 71 illustratively extends through the opening 70 of the hub 74 and within the spout portion 76 to an outlet 78 positioned above the sink basin 14 for dispensing water thereto.

A waterway assembly 80 is supported by the platform 54 of the cap 46 and defines a longitudinal axis 81. The waterway assembly 80 illustratively includes an interface member or base 82 in the form of a puck or disk having a hot water inlet opening 84, a cold water inlet opening 86, and a mixed water outlet opening 88. With reference to FIG. 4, the openings 84, 86, 88 all illustratively extend between a first or upper surface 90 and a second or lower surface 92. The hot water inlet tube 28 and the cold water inlet tube 30 are fluidly coupled to the openings 84 and 86, respectively, in the interface member 82. Similarly, a mixed water outlet tube 94 is fluidly coupled to the opening 88 of the interface member 82. As detailed herein, the tubes 28, 30, and 94 are illustratively formed of a flexible non-metallic material, such as a polymer.

In the illustrative embodiment, the tubes 28, 30, and 94 and the interface member 82 are formed of compatible materials, such as polymers, and illustratively of cross-linkable materials. As such, the waterway assembly 80 is illustratively electrically non-conductive. As used within this disclosure, a cross-linkable material illustratively includes thermoplastics and mixtures of thermoplastics and thermosets. In one illustrative embodiment, the tubes 28, 30, and 94 and the interface member 82 are formed of a polyethylene which is subsequently cross-linked to form cross-linked polyethylene (PEX). However, it should be appreciated that other polymers may be substituted therefor. For example, the waterway assembly 80 may be formed of any polyethylene (PE) (such as raised temperature resistant polyethylene (PE-RT)), of polypropylene (PP) (such as polypropylene random (PPR)), or of polybutylene (PB). It is further envisioned that the waterway assembly 80 could be formed of cross-linked polyvinyl chloride (PVCX) using silane free radical initiators, of cross-linked polyurethane, or of cross-linked propylene (XLPP) using peroxide or silane free radical initiators.

Figure 5:
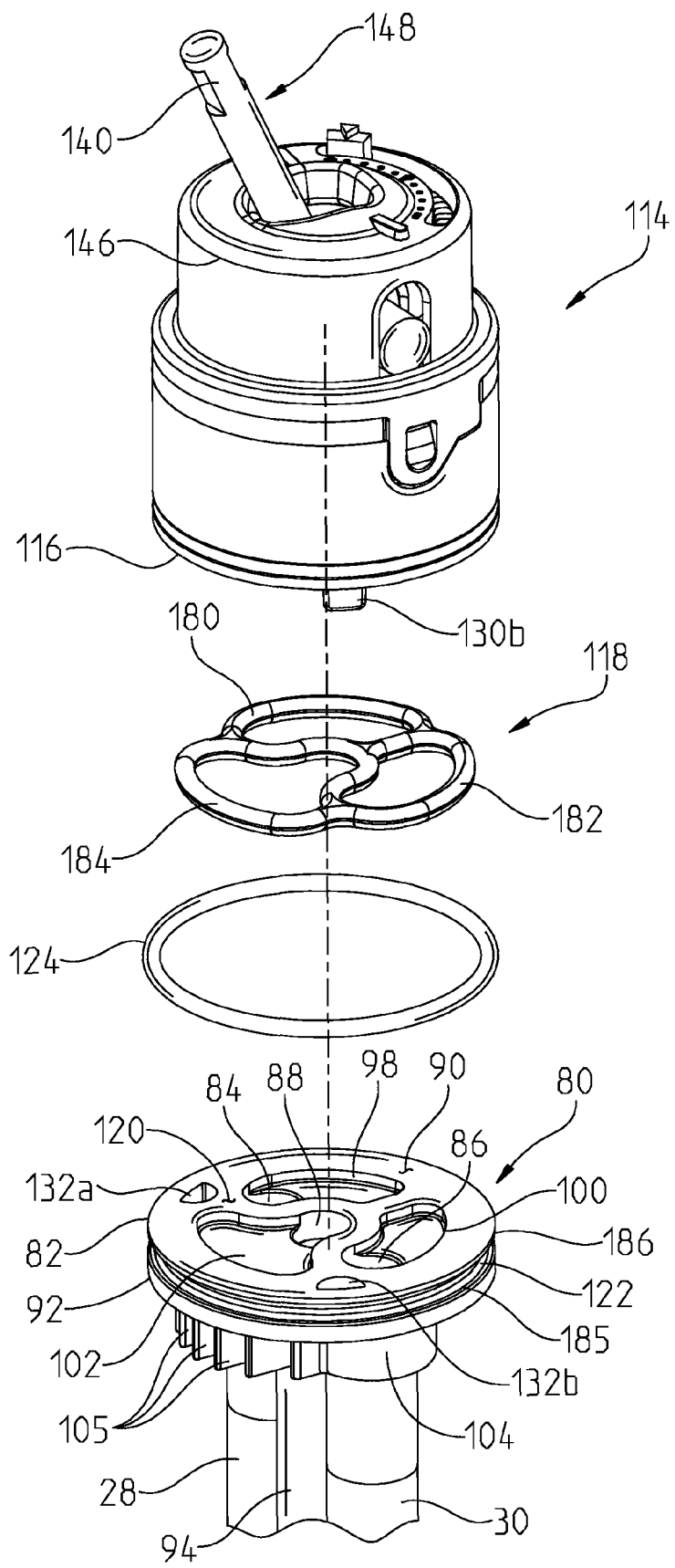
FIG. 5 is a detailed perspective view of the valve assembly, waterway assembly, face seal, and radial seal of the faucet of FIG. 1.

The upper ends 95 of tubes 28, 30, and 94 are positioned within the openings 84, 86, and 88 of the interface member 82. Each opening 84, 86, and 88 includes a counterbore 84a, 86a, and 88a (FIG. 4) extending upwardly from the lower surface 92 and defining a stop surface which cooperates with the upper ends 95 of the tubes 28, 30, and 94, respectively. In the illustrative embodiment, the interface member 82 is overmolded around the upper ends 95 of the tubes 28, 30, and 94. More particularly, the interface member 82 is formed of a polymer which is molded over the previously formed tubes 28, 30, and 62, in a manner detailed herein. The overmold interface member 82 partially melts the upper ends 95 of the tubes 28, 30, and 94, forming couplings or bonds between material of the interface member 82 and material of the tubes 28, 30, and 94. To facilitate the molding process, the openings 84, 86, and 88 and thus tubes 28, 30, and 94 are illustratively aligned along a common center axis 96. With reference to FIGS. 2 and 5, flow directing channels 98, 100, 102 are formed within upper surface 90 of the interface member 82 and are configured to facilitate fluid flow through openings 84, 86, and 88, respectively.

As shown in FIGS. 2-5, a support or reinforcing boss 104 illustratively extends downwardly from the lower surface 92 of the interface member 82 and surrounds the openings 84, 86, and 88. The boss 104 provides additional support to the tubes 28, 30, and 62 coupled to the interface member 82.

As shown in FIGS. 2 and 3, a registration element, illustratively a plurality of aligned ribs 105 may extend downwardly from the lower surface 92 of the interface member 82. The ribs 105 are configured to be received within a cooperating registration element, illustratively a notch 106 defined by the opening 60 formed within the cap 46 of the holder 42 to facilitate proper orientation of the waterway assembly 80 relative to the holder 42. It should be appreciated that the interface member 82 may be registered relative to the holder 42 in a number of ways, including providing the interface member 82 with an asymmetrical shape configured to cooperate with mating elements in the holder 42.

In the illustrative embodiment detailed herein, the interface member 82 is formed of polyethylene which has been overmolded around the tubes 28, 30, and 94 and subsequently cross-linked. It should be noted that reinforcing members, such as glass fibers, may be provided within the polyethylene of the interface member 82. While a polymer, such as cross-linkable polyethylene, is the illustrative material for the interface member 82, in certain embodiments other materials may be substituted therefore, such as brass or copper. Additionally, the tubes 28, 30, and 94 may be fluidly coupled to the interface member 82 in a variety of manners other than through overmolding, such as ultrasonic welding or heat staking.

As detailed herein, the interface member 82 of the waterway assembly 80 is illustratively secured to the tubes 28, 30, and 94 through overmolding. The basic principle of overmolding plumbing connections on the tubes is well known. Exemplary overmolds are shown in U.S. Pat. No. 5,895,695, U.S. Pat. No. 6,082,780, U.S. Pat. No. 6,287,501, and U.S. Pat. No. 6,902,210 each listing William W. Rowley as an inventor, the disclosures of which are all expressly incorporated by reference herein.

In the present method, the tubes 28, 30, and 94 are illustratively positioned within a mold (not shown) wherein pins or mandrels slide into each respective tube end 95 to prevent collapsing thereof during the injection molding process. The mold receives the parallel aligned ends 95 of the tubes 28, 30, and 94 and then receives a flowable polymer, illustratively polyethylene, which forms the appropriate interface member 82. As further detailed herein, the upper ends 95 of the tubes 28, 30, 94 are aligned along a common center axis 96 to facilitate opening and closing of portions of the mold. After the polymer sufficiently hardens, the mold is opened to release the interface member 82 and tubes 28, 30, and 94. Through overmolding, the end 95 of each tube 28, 30, and 94 partially melts and bonds with the overmolded material of the interface member 82. This makes a substantially monolithic waterway assembly 80.

As is known, polyethylene is flexible, or semi-rigid, and may be cross-linked to form PEX. Cross-linking polyethylene couples the individual molecule chains together and prevents splitting. The curing or cross-linking process may use any one of several different technologies to form, for example, PEX-A, PEX-B or PEX-C. PEX-A is formed by using peroxide to cross-link polyethylene. More particularly, PEX-A is formed of a polyethylene having incorporated therein peroxide. Upon heating the peroxide polyethylene above the decomposition temperature of the peroxide, "free" radicals are produced to initiate the cross-linking process. PEX-B is formed by using silane to cross-link polyethylene. PEX-B is formed by using silane-grafted polyethylene which is then "moisture-cured" by exposure to heat and water, also known as sauna curing. PEX-C is formed of polyethylene which is cross-linked by bombarding it with electromagnetic (gamma) or high energy electron (beta) radiation.

By overmolding, it is possible to obtain a material to material bond, thereby providing a substantially leak-proof coupling between the tubes 28, 30, and 94 and the interface member 82. The resulting overmolded waterway assembly 80 is then cross-linked by means known in the art, e.g., peroxide cross-linking, silane cross-linking, radiation cross-linking, etc. More particularly, and as detailed above, cross-linking can be performed by a silane process or a peroxide process, or combinations thereof, wherein cross-linking is completed in a hot bath. Each process has a cross-linking catalyst that causes the polymer to crosslink when certain temperature and pressure and/or humidity are used. In the illustrative embodiment, the waterway assembly 80 is passed under a radiation unit and the exposure causes cross-linking. While illustratively the final product (i.e., waterway assembly 80) is cross-linked, in certain circumstances it might be appropriate to cross-link individual components (i.e., tubes 28, 30, and 94, and interface member 82). In a further illustrative embodiment, the material for the interface member 82 may be partially cross-linked prior to overmolding, followed by further cross-linking after coupling to the tubes 28, 30, and 94.

With further reference to FIG. 2, the second ends 107 of each inlet tube 28 and 30 illustratively includes a fluid coupling 108, which may define couplings 36 and 38 shown in FIG. 1. Illustratively, each fluid coupling 108 includes an overmolded coupler 110 and cooperating internally threaded nut 112. Additional details regarding illustrative overmolded fluid couplings are provided in U.S. Pat. Nos. 5,895,695 and 6,287,501, and in U.S. patent application Ser. No. 12/233,839, filed Sep. 19, 2008, the disclosures of which are expressly incorporated by reference herein.

Referring further to FIG. 1, the outlet tube 94 includes an overmolded coupler 113 to facilitate coupling to spout tube 71, illustratively through a diverter valve assembly (not shown). The spout tube 71 may be formed of similar material as the outlet tube 94 (i.e., a polymer such as PEX), and in one illustrative embodiment may include a corrugated wall for enhanced flexibility. In other embodiments, the outlet tube 94 and the spout tube 71 may be formed as a single continuous tube extending from the interface member 82 to the spout outlet 78.

With reference to FIGS. 2-5, a valve assembly 114 is supported by the interface member or base 82 of the waterway assembly 80. A lower surface 116 of the valve assembly 114 sealingly engages a face seal, illustratively a gasket 118 received intermediate the interface member 82 and the valve assembly 114. The gasket 118 is illustratively formed of a resilient material, such as silicone. As shown in FIG. 5, a first seat 120 is supported by the interface member 82 and is configured to sealingly engage the gasket 118. As further detailed herein, a second seat 122 is also supported by the interface member 82 and is configured to sealingly engage a radial seal, illustratively an o-ring 124 formed of a resilient material, such as an elastomer.

Locating elements, illustratively locating pegs 130a and 130b, are positioned on the bottom of the valve assembly 114 and extend downwardly from the lower surface 116. The pegs 130a and 130b are configured to be received within second locating elements, illustratively recesses 132a and 132b, formed within the upper surface 90 of the interface member 82. The position of the pegs 130a and 130b within the recesses 132a and 132b facilitates proper orientation of the valve assembly 114 relative to the waterway assembly 80 and hence, alignment with the tubes 28, 30 and 94 and respective openings 84, 86, and 88, with appropriate ports 134, 136, and 138 of the valve assembly 114. Engagement between the pegs 130a and 130b and the recesses 132a and 132b may also improve resistance to torque generated between the valve assembly 114 and the interface member 82.

With reference to FIG. 5, the valve assembly 114 illustratively includes a stem 140 that may be actuated by a handle 142 (FIG. 1) to selectively allow variable temperature and flow rate of water to be supplied to outlet port 138 from hot water inlet port 134 and cold water inlet port 136. The interface member 82 of the waterway assembly 80 fluidly couples the hot water inlet port 134 to the hot water inlet tube 28, and fluidly couples the cold water inlet port 136 to the cold water inlet tube 30. The interface member 82 also fluidly couples the outlet port 138 to the outlet tube 94.

With further reference to FIGS. 4 and 5, the valve assembly 114 illustratively includes an upper housing 146, a stem assembly 148, a coupling member 150, a carrier 152, an upper disc 154, a lower disc 156, a seal 158, and a lower housing 160. The stem assembly 148 illustratively includes a ball 162 molded from a thermoplastic material over a portion of the stem 140. A longitudinal extension or knuckle 164 extends downwardly from the ball 162. The ball 162 transmits motion of the stem 140 to the upper disc 154 through the extension 164 and the carrier 152.

The upper disc 154 is positioned on top of the lower disc 156 to control the mixing of hot and cold water and the flow rate of water through the valve assembly 114. Illustratively, both the upper and lower discs 154 and 156 are constructed of a ceramic material, however, any suitable material may be used, such as stainless steel.

In a further illustrative embodiment, a temperature limiting member 166 is received intermediate the coupling member 150 and the upper housing 146. The temperature limiting member 166 limits lateral pivoting movement of the stem 140 and the extension 164, and hence the maximum allowable temperature of water flowing through the valve assembly 114.

Additional details of an illustrative valve assembly are provided in U.S. patent application Ser. No. 11/494,889, filed Jul. 28, 2006, the disclosure of which is expressly incorporated by reference herein. While the illustrative valve assembly 114 is of a movable disc variety, it should be appreciated that other types of valve assemblies may be substituted therefor. For example, a ball-type mixing valve assembly may find equal applicability with the present invention. Illustrative ball-type valve assemblies are detailed in U.S. Pat. No. 4,838,304 to Knapp, U.S. Pat. No. 5,615,709 to Knapp, U.S. Pat.

No. 5,927,333 to Grassberger, and U.S. Pat. No. 6,920,899 to Haenlein et al., the disclosures of which are expressly incorporated by reference herein.

With reference to FIGS. 2-4, a locking member, illustratively a cylindrical sleeve or nut 170 is received over the valve assembly 114 and waterway interface member 82. The locking sleeve 170 includes internal threads 172 that engage with the external threads 62 of the cap 46. The locking sleeve 170 forces the valve assembly 114 toward the interface member 82 of the waterway assembly 80, thereby compressing the gasket 118 for effecting a seal therebetween. An upper end of the locking sleeve 170 includes a tool engagement member, illustratively a plurality of flats 176 for engagement with a wrench (not shown). In one illustrative embodiment, the locking sleeve 170 is formed of a metal, such as brass.

A primary fluid seal is defined by the face seal or gasket 118, while a secondary fluid seal is defined by the radial seal or o-ring 124. The gasket 118 is illustratively received within a channel 178 formed within lower surface 116 of the valve assembly 114 and seals against seat 120 defined by the upper surface 90 of the interface member 82. The channel 178 may be formed in either or both of the lower surface 116 of the valve assembly 114 and the upper surface 90 of the interface member 82. While the channel 178 facilitates proper positioning and enhanced sealing of the gasket 118, in certain embodiments the channel 178 may be eliminated.

With reference to FIG. 5, the gasket 118 illustratively includes first and second closed portions or loops 180 and 182 which extend around the flow directing channels 98 and 100 associated with the hot and cold water openings 84 and 86 of the interface member 82, respectively. A third loop 184 is connected to the first and second loops 180 and 182 and extends around the flow directing channel 102 associated with the outlet port 88 of the interface member 82. The first loop 180 of gasket 118 defines a fluid seal between the hot water inlet tube 28 of the waterway assembly 80 and the hot water inlet port 134 of the valve assembly 114. Similarly, the second loop 182 of the gasket 118 defines a fluid seal between the cold water inlet tube 30 and the cold water inlet port 136 of the valve assembly 114. The third loop 184 defines a fluid seal between the outlet tube 94 and the outlet port 138 of the valve assembly 114.

As detailed herein, gasket 118 is received intermediate the interface member 82 and the valve assembly 114 to effect a face seal therebetween. A radial seal is defined by the o-ring 124 and is positioned laterally outwardly from the face seal defined by the gasket 118. The o-ring 124 is illustratively positioned intermediate the interface member 82 and the locking sleeve 170. In one illustrative embodiment, the o-ring 124 is received within an annular groove 185 formed within an annular edge 186 of the interface member 82.

Figure 6:
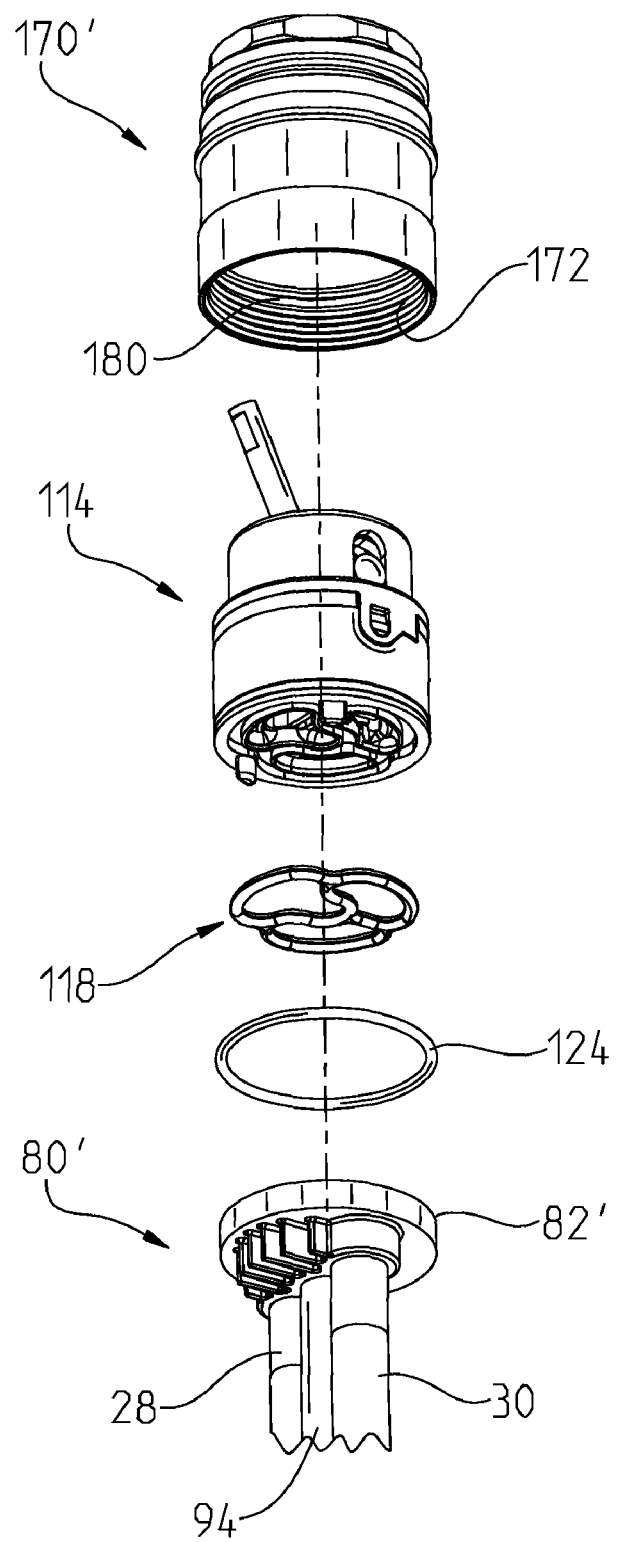
FIG. 6 is a partial bottom exploded perspective view of a further illustrative embodiment faucet of the present disclosure.
Figure 7:
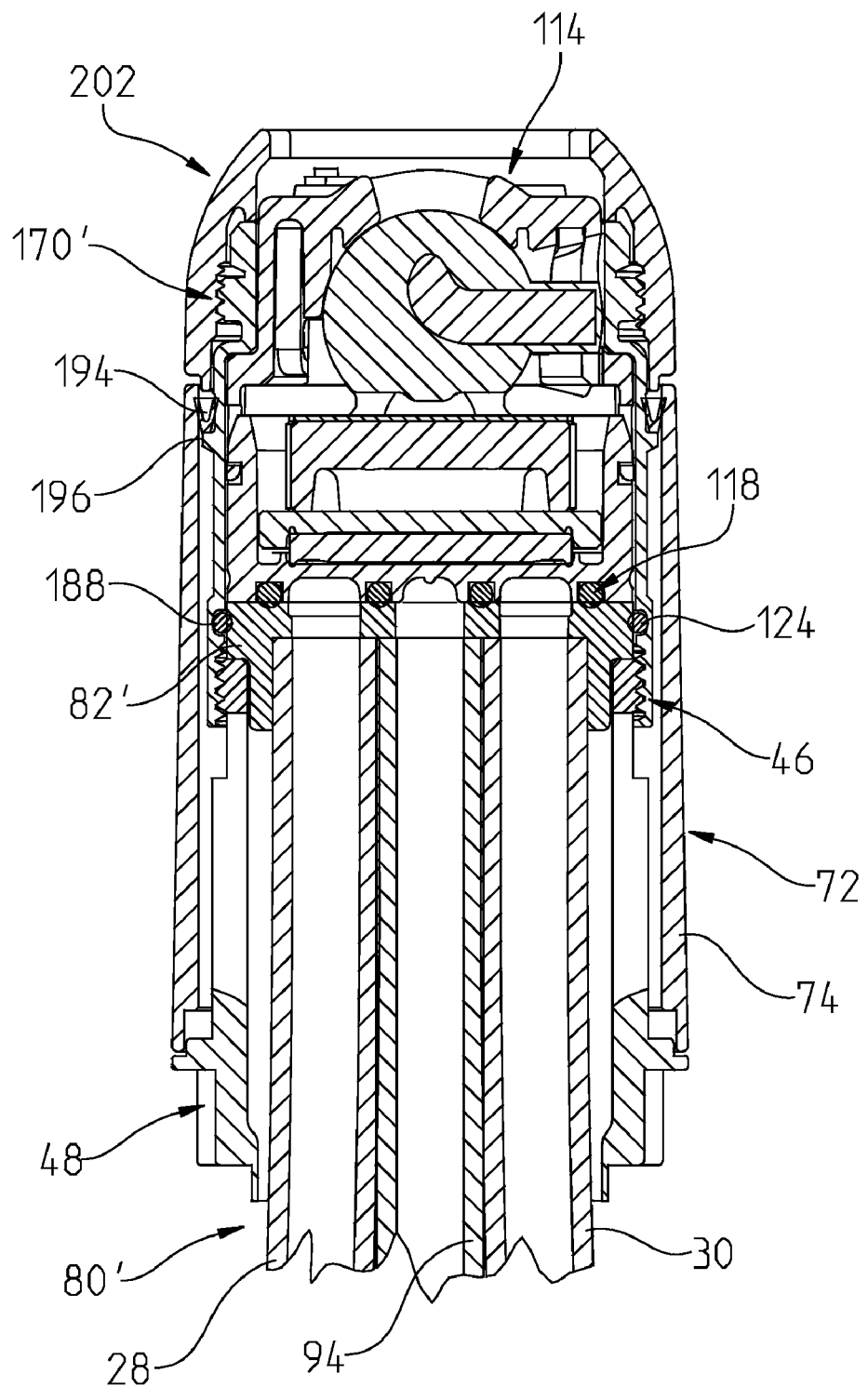
FIG. 7 is a cross-sectional view similar to FIG. 4 of the faucet of FIG. 6.

In a further illustrative embodiment of FIGS. 6 and 7, the o-ring 124 is received within an annular groove 188 formed within the sleeve 170'. In another embodiment, grooves 185 and 188 may be formed in both the interface member 82 and the sleeve 170', respectively, to receive portions of the o-ring 124.

The radial seal effected by the o-ring 124 is configured to prevent potential water leakage from between the upper surface of the interface member 82 and the lower surface of the valve assembly 114 from passing downwardly over the edge 186 of the interface member 82 and below the sink deck 12. In other words, the o-ring 124 provides a secondary seal in addition to the primary seal of the gasket 118 in order to prevent water leakage below the sink deck 12. Instead, any potential leak through the gasket 118 between the interface member 82 and the valve assembly 114 will tend to move upwardly within the hub 74.

A guide ring 194 is concentrically received over the locking sleeve 170. The guide ring 194 is supported by an annular lip 196 of sleeve 170 and positioned intermediate the sleeve 170 and the hub 74. More particularly, the guide ring 194 is configured to frictionally engage with an inside surface 198 of the hub 74 to prevent wobbling between the hub 74 and the sleeve 170. In one illustrative embodiment, the guide ring 194 is formed of a acetal copolymer, such as a polyoxymethylene (POM).

The spout hub 74 is received over the locking sleeve 170 and is secured in position by a bonnet cap 202. The bonnet cap 202 includes internal threads 204 that engage with external threads 206 formed in an upper end of the locking sleeve 170. In one illustrative embodiment, the bonnet cap is formed of a polymer, such as acrylonitrile butadiene styrene (ABS).

Although the invention has been described in detail with reference to certain preferred embodiments, variations and modifications exist within the spirit and scope of the invention as described and defined in the following claims.

The invention claimed is:

1. A fluid delivery device comprising:
a waterway assembly defining a longitudinal axis and including a first fluid transport component, a second fluid transport component, and an interface member coupled to an end of the first fluid transport component and an end of the second fluid transport component;
a valve assembly fluidly coupled to the interface member of the waterway assembly, the valve assembly including a first port in fluid communication with the first fluid transport component, a second port in fluid communication with the second fluid transport component, and a movable valve member configured to control the flow of water through the first port and the second port;
a primary seal positioned intermediate the interface member of the waterway assembly and the valve assembly, the primary seal configured to provide a fluid seal between the first fluid transport component of the waterway assembly and the first port of the valve assembly and a fluid seal between the second fluid transport component of the waterway assembly and the second port of the valve assembly;
a secondary seal positioned laterally outwardly from the primary seal, the secondary seal configured to sealingly couple to the interface member of the waterway assembly;
wherein the interface member of the waterway assembly is formed of a polymer, the first fluid transport component of the waterway assembly is formed of a polymer, and the second fluid transport component is formed of a polymer; and
the interface member is overmolded around the end of the first fluid transport component and the end of the second fluid transport component to provide a substantially monolithic waterway assembly.

2. The fluid delivery device of claim 1, further comprising:
a holder supporting the interface member of the waterway assembly; and
a locking member operably coupled to the valve assembly and configured to secure the valve assembly to the waterway assembly.

3. The fluid delivery device of claim 2, wherein the secondary seal comprises an o-ring positioned radially intermediate the interface member of the waterway assembly and the locking member.

4. The fluid delivery device of claim 2, wherein the locking member comprises a sleeve operably coupled to the holder and forcing the valve assembly toward the waterway assembly.

5. The fluid delivery device of claim 1, wherein the primary seal comprises a gasket including a first loop portion surrounding the first port of the valve assembly and a second loop portion surrounding the second port of the valve assembly.

6. The fluid delivery device of claim 5, further comprising a channel formed within at least one of the upper surface of the interface member of the waterway assembly and a lower surface of the valve assembly, the gasket being received within the channel.

7. The fluid delivery device of claim 1, further comprising a sleeve receiving the interface member of the waterway assembly, wherein an annular groove is formed in at least one of the interface member of the waterway assembly and the sleeve, and the secondary seal comprises an o-ring received within the annular groove.

8. A waterway assembly comprising:
an interface member including a disk having a first surface, a second surface, and an arcuate peripheral edge extending between the first surface and the second surface;
a first opening extending through the first surface and the second surface of the interface member;
a second opening extending through the first surface and the second surface of the interface member;
a first seat supported by the first surface of the interface member and configured to sealingly engage a face seal;
a second seat defined by the arcuate peripheral edge of the interface member and configured to sealingly engage a radial seal;
a first fluid transport component fluidly coupled to the first opening;
a second fluid transport component fluidly coupled to the second opening; and
wherein the first fluid transport component of the waterway assembly is formed of a polymer, the second fluid transport component is formed of a polymer, and the interface member is formed of a polymer overmolded around ends of the first fluid transport component and the second fluid transport component.

9. The waterway assembly of claim 8, further comprising a support boss extending from the second surface and configured to support the first and second fluid transport components.

10. The waterway assembly of claim 8, wherein the face seal comprises a gasket including a first loop portion surrounding the first opening and a second loop portion surrounding the second opening.

11. The waterway assembly of claim 10, further comprising a channel formed within the first surface of the interface member, the gasket being received within the channel.

12. The waterway assembly of claim 8, further comprising an annular groove formed within the interface member and configured to receive the radial seal.

13. A fluid delivery device comprising:
a holder;
a waterway assembly including an interface member supported by the holder, a hot water inlet tube having a first end fluidly coupled to the interface member and a second end configured to be fluidly coupled to a hot water supply, and a cold water inlet tube having a first end fluidly coupled to the interface member and a second end configured to be fluidly coupled to a cold water supply;
a valve assembly including a hot water inlet port in fluid communication with the hot water inlet tube, a cold water inlet port in fluid communication with the cold water inlet tube, and a movable valve member configured to control the flow of water through the hot water and cold water inlet ports;
a face seal positioned intermediate the waterway assembly and the valve assembly;
a locking member operably coupled to the valve assembly and configured to secure the valve assembly to the waterway assembly, the locking member comprising a sleeve operably coupled to the holder and forcing the valve assembly toward the waterway assembly;
a radial seal positioned intermediate the interface member of the waterway assembly and the locking member;
wherein an annular groove is formed in at least one of the interface member of the waterway assembly and the sleeve, and the radial seal comprises an o-ring received within the annular groove;
the interface member of the waterway assembly is formed of a polymer, the hot water inlet tube of the waterway assembly is formed of a polymer, and the cold water inlet tube is formed of a polymer; and
the interface member is overmolded around ends of the hot water inlet tube and the cold water inlet tube.

14. The fluid delivery device of claim 13, wherein the face seal comprises a gasket including a first loop portion surrounding the hot water inlet port of the valve assembly and a second loop portion surrounding the cold water inlet port of the valve assembly.

15. The fluid delivery device of claim 14, further comprising a channel formed within at least one of an upper surface of the interface member of the waterway assembly and a lower surface of the valve assembly, the gasket being received within the channel.

16. The fluid delivery device of claim 13, wherein the face seal is configured to provide a fluid seal between the hot water inlet tube of the waterway assembly and the hot water inlet port of the valve assembly, and a fluid seal between the cold water inlet tube of the waterway assembly and the cold water inlet port of the valve assembly.

* * * * *